United States Patent [19]

Poland

[11] 4,298,949

[45] Nov. 3, 1981

[54] ELECTRONIC CALCULATOR SYSTEM HAVING HIGH ORDER MATH CAPABILITY

[75] Inventor: Sydney W. Poland, Arlington, Tex.

[73] Assignee: Texas Instruments Incorporated, Dallas, Tex.

[21] Appl. No.: 714,464

[22] Filed: Aug. 16, 1976

[51] Int. Cl.[3] .......................... G06F 9/30; G06F 15/02

[52] U.S. Cl. .................................... 364/706; 364/200; 364/709

[58] Field of Search ...................... 235/156; 340/172.5; 364/200, 706, 709

[56] References Cited

U.S. PATENT DOCUMENTS

| | | | |
|---|---|---|---|
| 3,593,313 | 7/1971 | Tomaszewski et al. | 340/172.5 |
| 3,760,171 | 9/1973 | Wang et al. | 235/156 |
| 3,859,636 | 1/1975 | Cook | 340/172.5 |
| 3,942,156 | 3/1976 | Mock et al. | 340/172.5 |
| 3,953,833 | 4/1976 | Shapiro | 340/172.5 |
| 3,971,925 | 7/1976 | Wenninger et al. | 235/156 |

*Primary Examiner*—Jerry Smith

*Attorney, Agent, or Firm*—Melvin Sharp; Leo Heiting; Robert D. Marshall, Jr.

[57] ABSTRACT

Disclosed is an electronic calculator system having an input for receiving data and command signals, a memory for storing inputted data and data to be outputted, an arithmetic unit for performing arithmetic operations on the data stored in the memory, a first read-only-memory for storing groups of instruction words for controlling the data stored within the memory and for controlling the arithmetic operations performed by the arithmetic unit, a second read-only-memory for storing a set of program codes, each program code being effective for addressing a selected group of instruction words and control circuitry for reading out the groups of instruction words corresponding to an addressed set of program codes.

6 Claims, 3 Drawing Figures

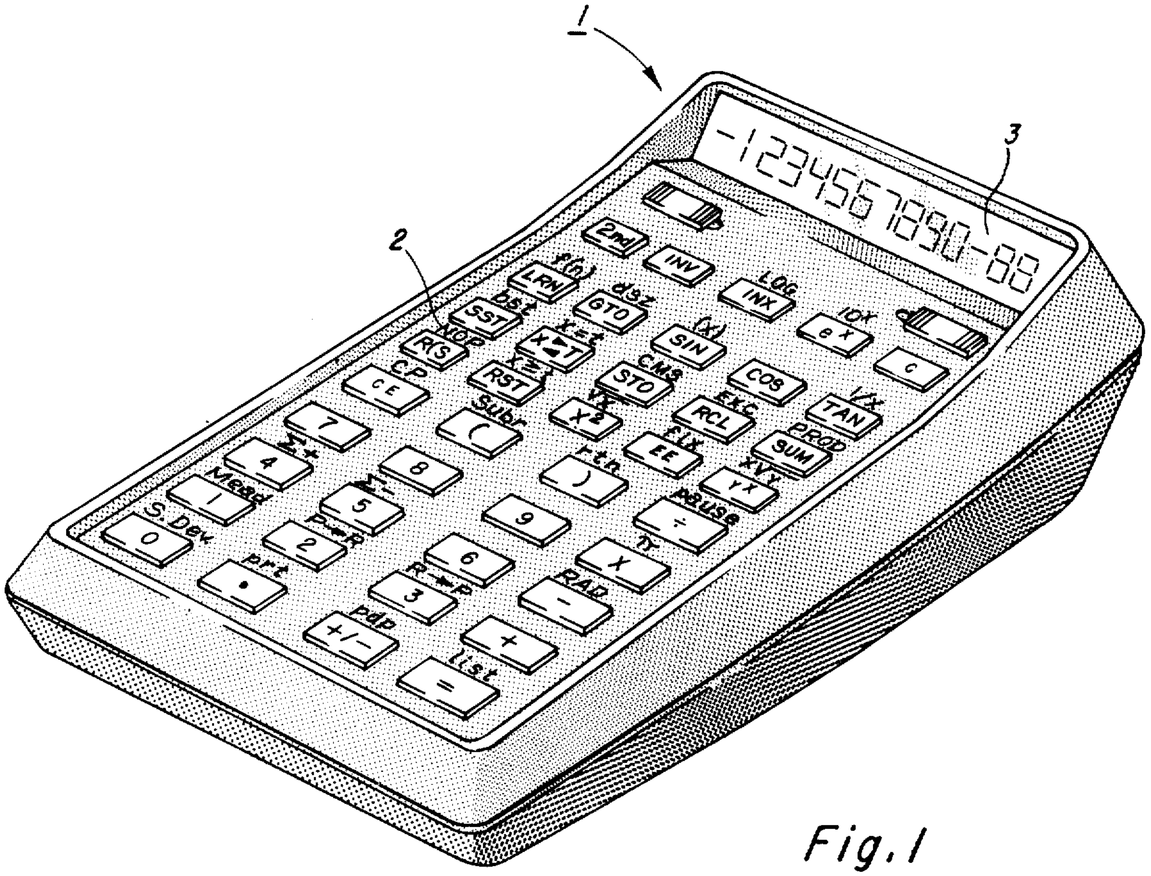
Fig. 1
Fig. 3
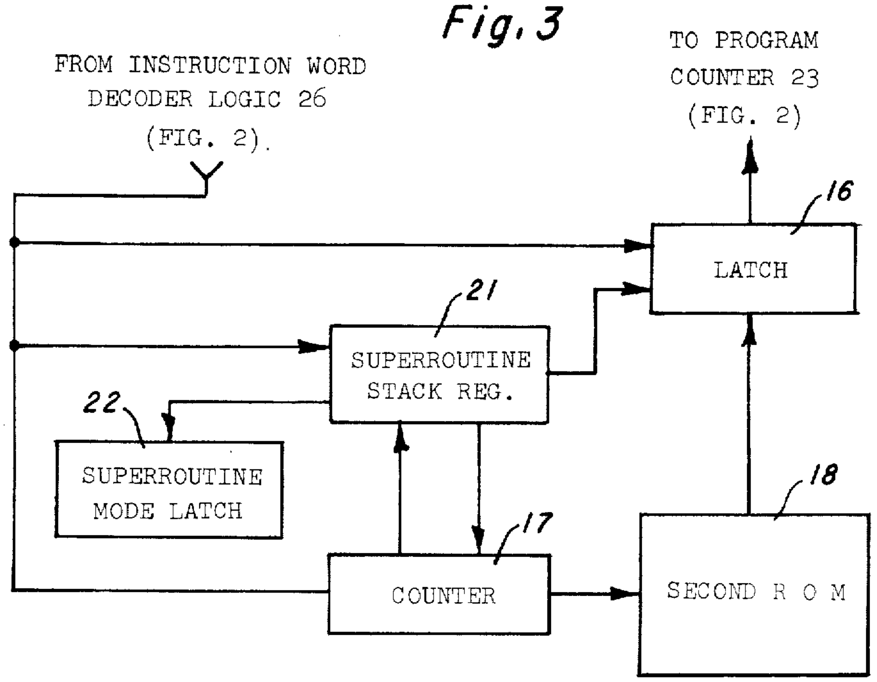

ELECTRONIC CALCULATOR SYSTEM HAVING HIGH ORDER MATH CAPABILITY

BACKGROUND OF THE INVENTION

This invention relates to microprocessor systems and more specifically to electronic calculators having the capability of solving higher order or complex mathematic problems. Electronic calculators have evolved from comparatively simple machines which add, subtract, multiply and divide the data entered into the calculator to machines which can perform sophisticated financial and mathematical operations such as, for example, changing polar coordinates to rectangular coordinates or solving compound or annuity interest problems. The calculator systems developed to date have had a single or multiple read-only-memory (ROM's) in which groups of instruction words are stored as microcode. The different groups of instruction words stored in the ROM cause the calculator's arithmetic unit, memory and display to cooperate to perform desired mathematical operations when instruction words are read out of the ROM. The ROM is addressed or controlled by a keyboard or other input means associated with the electronic calculator or microprocessor system. Thus, the depression of a key causes a selected group of instruction words to be read out of the ROM and these instruction words are provided to circuits controlling the inputting of data, the storage of data and the manipulation of data to perform the operation or function invoked by the key depressed. Thus, the instruction words generated by the ROM cause data to be entered, stored, and manipulated using, for instance, an arithmetic unit to perform such functions as adding, subtracting, multiplying, dividing or performing higher order or complex mathematical operations on the data.

Each instruction word typically has a length of eight to sixteen binary bits and the performance of even a relatively simple operation, such as adding two floating point numbers, requires a group of many instruction words. For instance, the addition of two floating point numbers may require as many as 75 instruction words having thirteen bits each, thus absorbing 975 bits of ROM area to be able of performing such a simple operation. Similarly, the subtraction operation has a comparable set of instruction words and so on for other operations and functions.

Modern electronic calculators now perform sophisticated arithmetic and financial computations such as, for example, squaring, taking square roots, converting from polar to rectangular coordinates, computing logorithms and trigometric relationships, compounding interest, and other such computations. These computations have typically been implemented into the electronic calculator by increasing the size of the ROM to accommodate the larger number of instruction words associated with these higher order computations. While the size of commercially available ROM's has increased during the past several years, the library of computational programs desired to be implemented in an electronic calculator has grown at even a faster rate. For example, it is desirable to have an electronic calculator capable of performing an entire library of computations related to electrical engineering, mechanical engineering, surveying, or the like. However, an electronic engineering library of computations could comprise, for instance, 45 computational programs or more, each of which require as many as 600 instruction words implemented in a read-only-memory. Thus an entire computational library would include for example, on the order of 27,000 instruction words of thirteen bits each which would require many conventional chips to implement the electrical engineering library in a conventional calculator. Of course, using a large number of chips can significantly increase the cost of an electronic calculator as well as making the packaging for hand-held use more difficult.

It is an object, therefore, of this invention to improve electronic calculators and microprocessors.

It is another object of this invention to increase the number of computational programs stored in an electronic calculator without correspondingly increasing the size of the ROM(s) implemented in the electronic calculator.

It is another object of this invention to permanently store a large number of computational programs in the hand-held electronic calculator using a small number of chips.

The aforementioned objects are satisfied as is now described. Generally, and in accordance with the preferred embodiment of the invention, an electronic calculator is equipped with first and second ROM's. The first ROM stores a plurality of groups of instruction words, each group effective for controlling an arithmetic unit to perform basic arithmetic operations such as adding, subtracting, multiplying and dividing, taking square roots, forming logarithmic and trigonometric operations and so forth in response to the operation of the first set of keys on a calculator keyboard. Each of these groups of these instruction words contains on the order of 75 to 200 instruction words. Thus, the first ROM is used as a main ROM as in a conventional calculator or microprocessor. The second ROM stores a plurality of sets of program codes. Each set of program codes are capable of performing a higher order mathematical program and are read out of the second ROM in response to operation of a second set of keys on the calculator keyboard. Each program code typically comprises eight binary bits and is effective for addressing a group of instruction words stored in the first ROM in much the same manner as depression of a key in the first set of keys. Thus, a set of program codes may mimic the depression of a plurality of keys in the first set of keys. Therefore, each higher order mathematical program is preferably a series of the basic arithmetic operations stored in the first ROM combined with operations for entry of data and/or constants. The second ROM reads out program codes which serve to address the groups of instruction words stored in the first ROM. By using the second ROM to store such higher order calculational programs, a second set of keys can be used to input commands triggering a long chain of basic arithmetic operations, including data entry operations, without the chance of human error and at a much greater speed than a human operator. Thus, the second ROM, in the preferred embodiment, stores sets of program codes, each program code effective for addressing the first ROM in much the same manner as a single depression of a key in the first set of keys; therefore, a set of such program codes may be advantageously utilized for a large number of higher order of calculational programs, in an electronic calculator. Since the second ROM must only store on the order of eight bits, or so, to select or address an entire group of instruction words, it should be evident to one trained in the art that by utilizing the second ROM herein disclosed that great economies can be effected in total ROM area, when compared with prior art techniques. While I have referred to first and second sets of keys on the calculator keyboard, it is well known that a single physical key may be used to perform several functions and therefore the keys referred to in the first and second sets may be physically the same keys.

BRIEF DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings, wherein:

FIG. 1 is a pictorial view of an electronic portable calculator of the type which may embody the invention;

FIG. 3 is a block diagram of another embodiment of the invention which may be utilized with a modern electronic calculator of the type depicted in FIG. 2.

DETAILED DESCRIPTION

Figure 2:
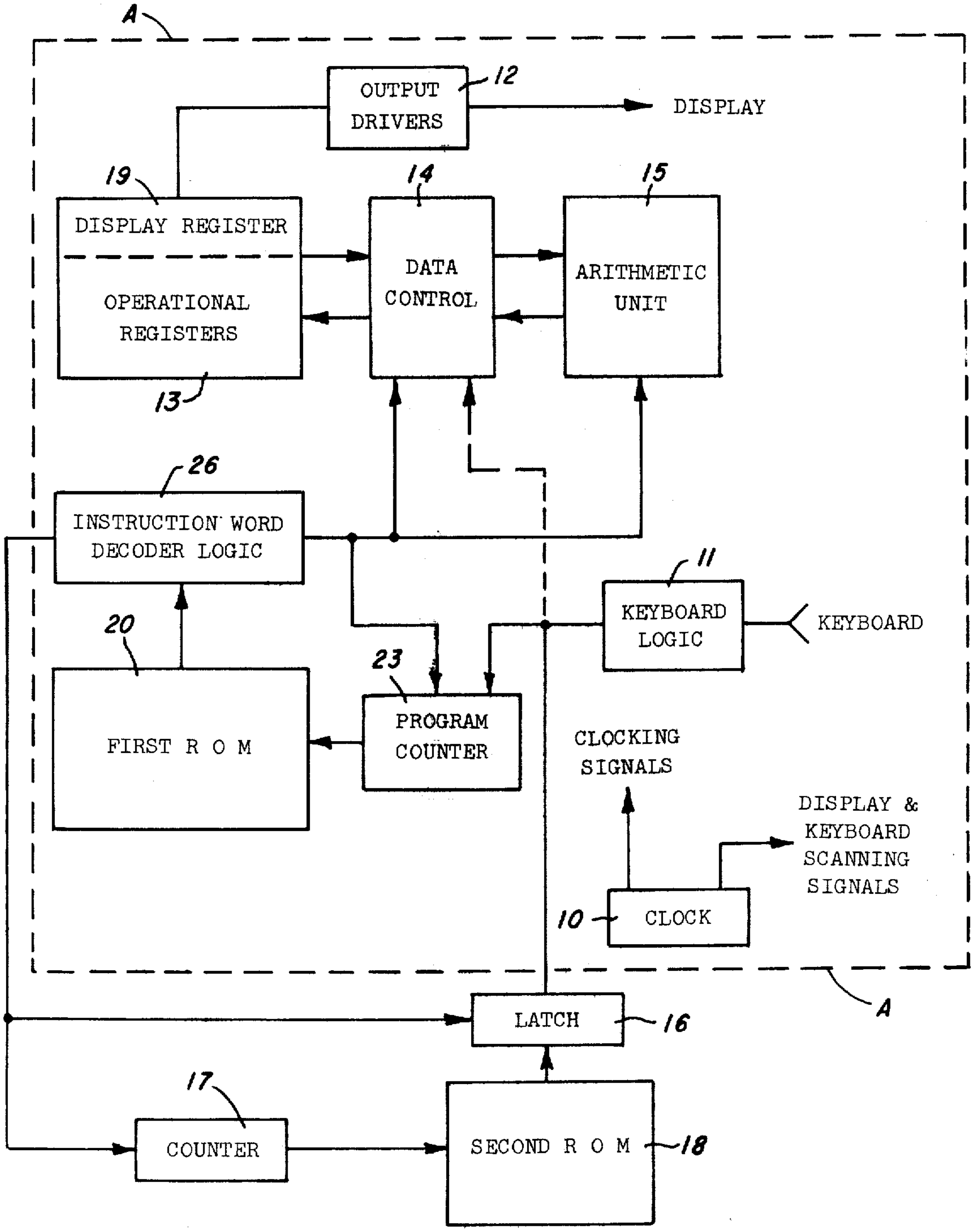
FIG. 2 is a block diagram of a modern electronic calculator equipped with one embodiment of the invention.

Referring to FIG. 1, an electronic portable calculator of the type which may employ features of this invention is shown in pictorial form. The calculator 1 comprises the keyboard 2 and the display 3. The display 3, in one embodiment, consists of fourteen digits or characters, each provided by an array of light emitting diodes, a liquid crystal display, gas discharge tube or other display means. The display is preferably implemented to having ten mantissa digits, two exponent digits, and two character places for negative signs, etc., (one for the mantissa and one for the exponent), thereby permitting outputting the data in scientific notation for instance. Of course, the type of display and the number of digits displayed is a design choice. Ordinarily, the display would be of the seven segment or eight segment variety, with provisions for indicating a decimal point for each digit. The display 2 includes a number of keys (0–9), a decimal point key, the conventional plus (+), minus (−), multiply (×), divide (÷), and equal (=) keys. Further the keyboard includes keys for exponentation ($Y^x$ and $\sqrt[x]{Y}$) and trigonometric relationships (Sine X, Cosine X, and Tangent X). The calculator is further provided with higher order mathematical keys for such functions as calculating the mean and standard deviation (Σ+, Σ−, mean, and S. Dev.), polar/rectangular conversions (P→R and R→P) and the like. Further, the calculator may be provided with keys for storing and recalling data for memory, for clearing the calculator (C) and for clearing the last entry (CE).

In FIG. 2, there is shown in block diagram form, the basic elements of a modern electronic calculator implemented on one or more semiconductor chips. It is to be understood that the block diagram of FIG. 2 is not intended to represent the block diagram of a detailed representation of electronic calculator, but is merely intended to indicate how the additional elements of my electronic calculator system having higher order of math capability are incorporated into a typical electronic calculator. Thus, the calculator of FIG. 2, is shown with a clock 10 which provides clocking signals for transferring data throughout the electronic calculator and provides scanning signals for scanning the display 3 and keyboard 2 or other data entry means. The inputs for the keyboard 2 are provided to keyboard logic 11 which provides an address in response to the depression of a particular key to program counter 23. It should be evident to one skilled in the art that keyboard logic 11, as well as other logic circuitry, may be implemented in the calculator as the elements described or may be implemented as a part of read only memory 20 and instruction word decoder logic 26.

The address received from keyboard logic 11 is inserted into program counter 23 and is utilized in addressing the First Read Only Memory (ROM) 20. First ROM 20 stores the microcode for performing basic arithmetic operations and outputs an instruction word in response to the address contained in program counter 23. Program counter typically includes an add-one circuit for incrementing the address in program counter 23. Thus, program counter 23 causes a group of instruction words to be read out of First ROM 20 in response to the incrementing of program counter 23, each instruction word being read out during an instruction cycle. The group of instruction words read out of First ROM 20 corresponds to the address received from keyboard logic 11.

The instruction words read out of First ROM 20 are decoded by instruction word decoded logic 26 to provide instruction commands to program counter 23, arithmetic unit 15 and data control 14. The instruction commands provided to program counter 23 enable branches to be executed by inserting a new address into program counter 23 in response to a branch instruction command stored in First ROM 20. Instruction commands provided to data control 14 and arithmetic unit 15 control the manipulation of numeric data in the calculator. Instruction word decoder 26 is also interconnected with a counter 17 and a latch 16 in my electronic calculator system having higher order of math capability.

Data control 14 is interconnected with display register 19, operational registers 13 and with the arithmetic unit 15. Display register 19 stores the number displayed by the display 3 and has associated therewith a plurality of operational registers 13 which are used in conjunction with arithmetic unit 15 to perform arithmetic operations in response to particular instruction commands. Output drivers 12, interconnect display register 19 with a display 3 for decoding the electrical signal, stored in display register 19 and for driving display 3. Data control 14 comprises a series of selector gates for interconnecting the appropriate operational registers 13 and display register 19 with the arithmetic unit 15, with portions of instruction words, (if need be), or with logic signals from keyboard 2 (if need be).

Numeric data is inputted into display register 19 from keyboard 2 either by a data path from keyboard logic 11 via data control 14 under the control of appropriate instruction commands or by inputting selected portions of an appropriate instruction word in response to selected instruction commands. The electronic calculator system hereinbefore described, that being the portion shown within the reference. A dashed line in FIG. 2, basically corresponds to the type of electronic calculators known in the prior art. Examplary of the prior art calculators systems is the calculator system disclosed in U.S. Pat. No. 3,922,538, issued to Cochran et al. on Nov. 25, 1975, and assigned the assignee of this invention.

Also in FIG. 2, there is shown a counter 17 and a latch 16 which is responsive to outputs from instruction word decoder logic 26. The counter 17 has an output for addressing a Second ROM 18. Second ROM 18 outputs a program code in response to the inputted address, the program codes being outputted via latch 16 to program counter 23. When keyboard logic 11 decodes keyboard outputs indicating that a higher order of math calculation is to be executed, the higher order of math calculation being preferably a series of basic arithmetic functions and operations of the type implemented in First ROM 20, keyboard 11 preferably inputs an address into program counter 23 which causes First ROM 20 to branch to a location therein for calling a program from Second ROM 18. When a program is called from Second ROM 18, instruction word decoder logic 23 first sets latch 16 to permit the program codes outputted by Second ROM 18 to be inputted into program counter 23. The program codes outputted by Second ROM 18 effectively jam an address into program counter 23 for addressing First ROM 20. The first such code preferably causes the First ROM 20 to branch to a location for performing the first basic arithmetic operation or function required by the Second ROM 18 program. The program codes may take the same logical format, for instance, as the output from keyboard logic 11. When calling a program from Second ROM 18, instruction word decoder logic 26 also jams an address into counter 17, the address being the first location in Second ROM 18 of the called program. It should be evident moreover, that counter 17 could be loaded with an address directly from keyboard logic 11 in lieu of from instruction decoder logic 26, this being essentially a design choice.

After the first program code is read out of Second ROM 18 via latch 16 and loaded into program counter 23 then First ROM 20 cycles through a group of instruction words to accomplish the indicated basic arithmetic operation or function. Of course, the number of instruction cycles required to accomplish the indicated operation or function depends on, for instance, a number of instruction contained for that basic operation or function in First ROM 20. As is well known, those operations or functions which are accessible via keyboard logic 11 from keyboard 2, usually contain instruction words for causing the display to be enabled at the end of the function or operation addressed in First ROM 20. Since, however, another program code is to be read from Second ROM 18 and inserted into program counter 23 upon accomplishment of the indicated function or operation, counter 17 includes an add-one circuit which is responsive to, for instance, a display command or other such command located near or at the end of a group of instruction words in First ROM 20 for accomplishing a basic arithmetic operation or a function. When the display command or other such command is decoded by instruction word decoder logic 26, the add-one circuit in counter 17 increments and causes Second ROM 18 to read out the next program code of the called program via the set latch 16 to program counter 23, which in turn causes First ROM 20 to cycle through another group of instructions to accomplish the function or operation indicated by the outputted program code. Again, towards the end of this next basic arithmetic function or operation, a display code or other such code will be decoded in instruction word decoder logic 26 causing the add-one circuit in counter 17 to increment counter 17, the cycle repeating itself.

The advantages of my Second ROM 18 and associated counter 17 and latch 16 should be evident to one trained in the art. This system permits equipping an electronic calculator with the capability of performing higher order calculational programs: for instance, changing polar coordinates to rectangular coordinates, doing financial calculations or solving complex engineering equations using significantly less total ROM area than would be required if such programs were implemented only in First ROM 20. Additionally, it should be evident that while the foregoing discussion has suggested that a program code read from Second ROM 18 mimics keyboard logic outputs from keyboard logic 11, the program codes read from Second ROM 18 could, in lieu thereof or in addition thereto, have codes which do not mimic the outputs from keyboard logic 11, but rather, for instance, would cause the program counter 23 to branch to locations in First ROM 20 which are not directly accessible from the keyboard. Thus an output from Second ROM 18 may cause program counter 23 to branch to a location in First ROM 20 which could not be accessed directly from the keyboard 2 via keyboard logic 11. One purpose for such a program code would be a program code in a called program to indicate that the end of the program had been reached. This program code, which I shall refer to as the "return" program code, preferably causes program counter 23 to branch to an address location in First ROM 20 which would contain a group of instructions for resetting latch 16 and for displaying the contents of display register 19. The display instruction preferably follows the reset latch instruction, so that when the display command causes counter 17 to increment (if so used), no branching will occur in response thereto at program counter 23. Also latch 16 inhibits outputs from Second ROM 18 from being inserted into program counter 23 whenever a display instruction or other such instruction is decoded by instruction word decoder logic 26 incrementing the add-one circuit in counter 17 when the calculator has not called a program from Second ROM 18.

Referring now to FIG. 3, there is shown a partial block diagram of a second embodiment of my calculator system having higher math capability. The latch 16 and counter 17 are interconnected with program counter 23 and instruction word decoder 26 as done in the embodiment shown in FIG. 2. In fact, this embodiment is similar to the embodiment in FIG. 2, except that a superroutine stack register 21 and an associated superroutine latch 22 have been interconnected with counter 23; stack 21 is responsive to outputs from instruction word decoder logic 26. Thus, the program codes outputted from Second ROM 18 are passed to program counter 23 via latch 16; counter 17 is used to address Second ROM 18 and is responsive to instruction word decoder logic 26 for inserting an initial address therein and for incrementing that address in response to decoded display commands, for instance. The superroutine stack 21 functions to either receive an address from counter 17 or to output an address to counter 17, both functions being in response to outputs from instruction word decoder logic 26.Superroutine stack 21 is a multilevel stack and functions in normal last-in-first-out mode. Superroutine stack 21 may be advantageously utilized in calculator systems with higher math capability so that the program codes stored in Second ROM 18, in addition to prescribing addresses for performing basic arithmetic operations and functions according to microcode stored in First ROM 20, may also use First ROM 20 for addressing Second ROM 18 itself. The advantages of this superroutine stack 21 may be best seen by example. For instance, Second ROM 18 may be implemented with program codes to perform the factorial function, and during the calculation of statistical programs, such as combinations and permutations, it is often advantageous to be able to use the factorial function. If a factorial function and the statistical combination function are both implemented in Second ROM 18, then the combination function program may call the factorial function, if a superroutine stack 21 is utilized. The point of exit from the combination function program must be stored so that the program can return thereafter accomplishing the factorial function. Thus, the address in counter 17 to which the program must return in Second ROM 18 after accomplishing the factorial function is stored in superroutine stack 21 because a new set of addresses will be loaded into counter 17 when the factorial function is executed. Whenever an address has been stored in superroutine stack 21, superroutine latch 22 is set. Further, as aforementioned, the factorial program will preferably have a "return" program code loaded in Second ROM 18 at the end thereof. This return code normally causes latch 16 to be reset. However, the return code is inhibited from setting latch 16 when superroutine latch 22 has been set. Latch 16 is not reset at this time because the program codes being read from the Second ROM 18 must continue to be inserted in program counter 23 to carry out the main program, e.g., the combination function program in the aforementioned example. Although the return code is not used to reset latch 16 if superroutine latch 22 is set, the return code is used to "pop" the address in the stack back into counter 17. Since stack 21 is a multi-level stack, several levels of "superroutines" may be utilized.

Referring now to TABLE I, there is shown a listing of the Second ROM code as is presently used in the SR-56 calculator manufactured by Texas Instruments Incorporated. The programs in the Second ROM are called by first pushing a function key (f(n)) and then pushing a number key. The number "0" key is used for calling standard deviation, the number "1" for calling mean, the number "2" key calling polar to rectangular conversions, the number "3" key for calling rectangular to polar conversions, the number "4" key for calling the Σ+ program to insert data in mean and standard deviation calculations and the number "5" key for calling the Σ− program to delete data from mean and standard deviation calculations.

The microcode used in the first ROM in the SR-56 calculator to implement the higher math system therein is listed in TABLE II. The SR-56 calculator uses two SCOM chips and one arithmetic chip of the type disclosed in the aforementioned U.S. Pat. No. 3,922,538. U. S. Pat. No. 3,922,538 is hereby incorporated herein by reference.

When implemented in the SR-56 calculator, the program code of the Second ROM 18 is loaded into the constant ROM of one of the aforementioned SCOM chips and counter 17 is formed using register F thereof. Latch 16 is implemented using the tenth flag in the B flag register which is denoted as BCONST in the mnemonics of TABLE II.

Referring again to TABLE II, there is shown a program listing of the instruction words loaded into the first ROM in the SR-56 calculator for implementing my higher math system. Reading from left to right, the first column contains the first ROM address (in hexadecimal), the instruction word (in binary), the statement number (merely for information) and various mnemonic and narrative terms (also for information). The instruction word format is explained in U.S. Pat. No. 3,922,538.

The function key (f(n) in FIG. 1), in combination with the number 0-5 keys are used to call a higher order math program. The microcode in TABLE I causes an address to be loaded into counter 17 for addressing Second ROM 18, the address being equal to three times the number key (0-5) depressed; thus, the zero key causes the address 0 to be loaded into counter 17, the number "2" causes the address 6 to be loaded into counter 17, and so forth. At address 0, there is a "go to" (GTO) program code which, in combination with the numbers 02 and 09 located at addresses 01 and 02, cause a branch to address 29 to occur, First ROM 20 loading a 29 into counter 17. The standard deviation program begins at location 29. Similarly, at addresses 03-05 there are program codes branching counter 17 to address 49 where the mean program begins; at addresses 06-08 there are program codes branching counter 17 to address 65 where the polar to rectangular coordinate conversion program begins; at addresses 09-11 there are program codes branching counter 17 to location 84 where the rectangular-to-polar coordinate conversion program starts; at addresses 12 to 14 there are program codes branching counter 17 to location 56 where the Σ+ program begins and address 15 is the beginning of the Σ− program. Also in TABLE II, in addition to the addresses of the program codes stored in Second ROM 18 and the associated codes stored at those addresses there is provided a brief description of the program code listed.

I have described the invention in connection with certain specific embodiments thereof. It is to be understood that modification may now suggest itself to those skilled in the art and that this invention is not limited to the specific embodiment disclosed, except as set forth in the appended claims.

TABLE I

| Address | Program Code | Brief Description Mnemonic | Comment |
|---|---|---|---|
| 00 | 22 | GTO | Std. Dev. Entry |
| 01 | 02 | 2 | |
| 02 | 09 | 9 | |
| 03 | 22 | GTO | Mean Entry |
| 04 | 04 | 4 | |
| 05 | 09 | 9 | |
| 06 | 22 | GTO | P → R Entry |
| 07 | 06 | 6 | |
| 08 | 05 | 5 | |
| 09 | 22 | GTO | R → P Entry |
| 10 | 08 | 8 | |
| 11 | 04 | 4 | |
| 12 | 22 | GTO | Σ + Entry |
| 13 | 05 | 5 | |
| 14 | 06 | 6 | |
| 15 | 12 | INV | Σ− Program |
| 16 | 35 | SUM | Deletes entry |
| 17 | 05 | 5 | from new $\Sigma X_i$ in memory 5 |
| 18 | 43 | $X^2$ | $(X_i)^2$ |
| 19 | 12 | INV | |
| 20 | 35 | SUM | Deletes entry |
| 21 | 06 | 6 | from new $\Sigma X_i^2$ in memory 6 |
| 22 | 01 | 1 | 1 in display reg |
| 23 | 12 | INV | |
| 24 | 35 | SUM | Deletes 1 from |

TABLE I-continued

| Address | Program Code | Brief Description: Mnemonic | Brief Description: Comment |
|---|---|---|---|
| 25 | 07 | 7 | new N in memory |
| 26 | 34 | RECALL | |
| 27 | 07 | 7 | New N in display reg. |
| 28 | 58 | RETURN | Exit |
| 29 | 34 | RCL | Std. Dev. Program |
| 30 | 07 | 7 | N |
| 31 | 74 | MINUS | |
| 32 | 01 | 1 | |
| 33 | 94 | EQUALS | (N − 1) |
| 34 | 20 | 1/X | 1/(N − 1) |
| 35 | 64 | MULTIPLY | |
| 36 | 52 | LEFT PAREN | |
| 37 | 34 | RECALL | |
| 38 | 06 | 6 | $\Sigma X_i^2$ |
| 39 | 74 | MINUS | |
| 40 | 34 | RECALL | |
| 41 | 05 | 5 | $\Sigma X_i$ |
| 42 | 43 | $X^2$ | $(\Sigma X_i)^2$ |
| 43 | 54 | DIVIDE | |
| 44 | 34 | RECALL | |
| 45 | 07 | 7 | N |
| 46 | 94 | EQUALS | $\sigma x^2$ |
| 47 | 48 | SQ ROOT | $\sigma x$ |
| 48 | 58 | RETURN | Exit |
| 49 | 34 | RECALL | Mean Program |
| 50 | 05 | 5 | $\Sigma X_i$ |
| 51 | 54 | DIVIDE | |
| 52 | 34 | RECALL | |
| 53 | 07 | 7 | N |
| 54 | 94 | EQUALS | Mean $\left(\frac{\Sigma Xi}{N}\right)$ |
| 55 | 58 | RETURN | Exit |
| 56 | 35 | SUM | Σ + Program |
| 57 | 05 | 5 | New $\Sigma X_i$ in memory 5 |
| 58 | 43 | $X^2$ | $(X_i)^2$ |
| 59 | 35 | SUM | |
| 60 | 06 | 6 | New $\Sigma X_i^2$ in memory 6 |
| 61 | 01 | 1 | 1 in display reg |
| 62 | 22 | GTO | calculate new N |
| 63 | 02 | 2 | by going to location 24 |
| 64 | 04 | 4 | |
| 65 | 33 | STORE | P → R Program |
| 66 | 08 | 8 | θ |
| 67 | 23 | SINE | SINE θ |
| 68 | 39 | EXCHANGE | |
| 69 | 08 | 8 | θ ⇌ sin θ in memory 8 |
| 70 | 24 | COSINE | COSINE θ |
| 71 | 33 | STORE | |
| 72 | 09 | 9 | COSINE θ in memory 9 |
| 73 | 32 | x ⇌ t | R |
| 74 | 30 | PRODUCT | |
| 75 | 08 | 8 | R sin θ = y |
| 76 | 30 | PRODUCT | |
| 77 | 04 | 9 | R COS θ = x |
| 78 | 34 | RECALL | |
| 79 | 08 | 9 | x |
| 80 | 32 | x ⇌ t | |
| 81 | 34 | RECALL | |
| 82 | 08 | 8 | y |
| 83 | 58 | RETURN | Exit |
| 84 | 33 | STORE | R → P Program |
| 85 | 08 | 8 | y in memory 8 |
| 86 | 00 | 0 | Zero = θ' |
| 87 | 32 | x ⇌ t | Zero in t register |
| 88 | 33 | STORE | |
| 89 | 09 | 9 | x in memory 9 |
| 90 | 47 | x ≧ t | is x ≧ 0 |
| 91 | 09 | 9 | if yes, go to location 98 |
| 92 | 08 | 8 | |
| 93 | 01 | 1 | otherwise, put 1 in display reg |
| 94 | 93 | +/− | change sign (−1) |
| 95 | 12 | INV | |
| 96 | 24 | COSINE | $COS^{-1}(-1) = \theta'$ |
| 97 | 32 | x ⇌ t | Store in t register |
| 98 | 34 | RECALL | |
| 99 | 08 | 8 | y |
| 100 | 39 | EXCHANGE | y put in memory 9, |
| 101 | 09 | 9 | x in display reg. |
| 102 | 12 | INV | |
| 103 | 30 | PRODUCT | |
| 104 | 09 | 9 | y/x in memory 9 |
| 105 | 43 | $x^2$ | $x^2$ |
| 106 | 39 | EXCHANGE | $x^2$ in memory 9, |
| 107 | 09 | 9 | y/x in display reg. |
| 108 | 12 | INV | |
| 109 | 25 | TANGENT | $\theta = \tan^{-1}(y/x)$ |
| 110 | 51 | CE | Clears error if overflow |
| 111 | 39 | EXCHANGE | θ in memory 8, |
| 112 | 08 | 8 | y in display reg. |
| 113 | 43 | $x^2$ | $y^2$ |
| 114 | 35 | SUM | |
| 115 | 09 | 9 | $x^2 + y^2 = R^2$ in memory 9 |
| 116 | 34 | RECALL | |
| 117 | 09 | 9 | $R^2$ |
| 118 | 48 | SQ ROOT | $\sqrt{R^2} = R$ |
| 119 | 33 | STORE | |
| 120 | 09 | 9 | R in memory 9 |
| 121 | 32 | x ⇌ t | Recall θ' from t register |
| 122 | 35 | SUM | |
| 123 | 08 | 8 | θ' summed with contents of memory 8 |
| 124 | 34 | RECALL | |
| 125 | 08 | 8 | θ + θ' in display reg. |
| 126 | 58 | RETURN | Exit |

TABLE II

| First ROM Address | Instruction Word | Statement | Mnemonics and Narrative Terms | | | |
|---|---|---|---|---|---|---|
| 00F1 | 0 0000 1011 1 001 | 0581 | CROM | SF | BCONST | (CONROM+2) |
| 00F2 | 0 0110 0111 1 110 | 0582 | | SPLD | EXP | |
| 00F3 | [illegible] | [illegible] | | EXAB | ALL | |
| 00F4 | [illegible] | [illegible] | | NUMBER | 5 | |
| 00F5 | 0 0110 1111 0 000 | 0585 | | RSA | EXP | |
| 00F6 | [illegible] | [illegible] | | CAD | EXP | |
| 00F7 | [illegible] | [illegible] | | EXAB | ALL | |
| 00F8 | [illegible] | [illegible] | | R1 | CRM | |
| 00F9 | [illegible] | [illegible] | | SF | PASS[illegible] | |
| 00FA | [illegible] | [illegible] | | [illegible] | [illegible] | |
| [illegible] | [illegible] | [illegible] | [illegible] | SF | [illegible] | |
| [illegible] | [illegible] | [illegible] | [illegible] | [illegible] | [illegible] | |
| [illegible] | [illegible] | [illegible] | [illegible] | [illegible] | [illegible] | |

```
00F[illegible]  0 0011 1011 0 101   0[illegible]         SETB      SK235
00F[illegible]  1 1 [illegible] 1   0[illegible]  [illegible]         BO    RSPBIT        ALWAYS
00F[illegible]  0 [illegible] 101   05[illegible]         [illegible]   SK209         **MUST BE AT LOC. FE **
                                   0577          **MUST BE AT LOC. 100 ***
0100  1 1 1100111010 0           0578  0423              BO    LPRXKESR      ALWAYS              (DCZ)
0101  1 1 1101110010 0           0599  0393              BO    EXCH          ALWAYS              (DCZ+1)
0102  1 1 0110011101 1           0600  0068              BO    SUBD          ALWAYS              (DCZ+2)
0103  1 1 1011100111 0           0601  0275              BO    STORE         ALWAYS              (DCZ+3)
0104  1 1 1111111000 0           0602  04FC              BO    IED           ALWAYS              (DCZ+4)
0105  1 1 0011100111 0           0602  016C              BO    IEC           ALWAYS              (DCZ+5)
010[illegible]  0 1010 [illegible] 0 111     0604                EXPR      NUMBER 3
0107  1 1 [illegible] 1           0605  [illegible]              BO    SETED         ALWAYS
010[illegible]  0 1010 [illegible] 0 111     060[illegible]                PLUS      NUMBER 2
010[illegible]  1 1 [illegible] 1           060[illegible]                        BO    SETED         ALWAYS
010[illegible]  0 [illegible] 1111 [illegible]    06[illegible]                AEXP      SF    AEXP1
010[illegible]  0 [illegible] 0 [illegible]     06[illegible]                          TF    AINV
                                   0610                *         ZF    AINV
0100  1 0 1001111101 0           0611  0349              BZ    AEXP2
010[illegible]  0 0000 0101 1 000     0612                          TF    BERASE
010F  0 0000 0101 1 010     0613                          ZF    BERASE
010F  0 0000 1110 1 001     0614                          SF    BSEXP2
0110  1 1 1001100010 0           0615  0372              BO    DIG3
0111  0 0000 0100 1 001     0616                          SF    BOPT
0112  1 1 1001100000 0           0617  0372              BO    DIG3          ALWAYS BRANCH
0113  0 0110 0111 0 110     0618                CRM       SLLO  EXP
0114  0 0001 1101 0 111     0619                          EXAF  ALL
0115  0 1100 0111 0 000     0620                          ADKA  MAEX
0116  0 1001 1101 1 000     0621                          CLA   MANT
0117  0 1100 1011 0 110     0622                          AADD  MAEX
0118  0 1100 1011 0 110     0623                          AADD  MAEY
0119  0 0001 1101 0 111     0624                          EXAF  ALL
011A  0 0000 0111 1 000     0625                          TF    BSTEP
011B  1 1 0000000010 0           0626  0110              BO    SUBR
011C  0 0000 1010 1 001     0627                          SF    BHOLD         PREVENTS INCREMENTING PROG CNTR AFTER HARD. FUNC
011D  0 1010 0001 1 111     0628                SUBR      RCLF                SAVES PC IN REG H
011E  0 0001 1101 0 011     0629                          LOADD ALL
011F  0 0001 0101 1 011     0630                          SRLR  ALL
0120  0 1010 0101 1 111     0631                          RCLH
0121  0 1001 1101 0 011     0632                          LOADA MANT
0122  0 0001 0101 0 011     0633                          SLLR  ALL
0123  0 0001 0101 0 011     0634                          SLLR  ALL
0124  0 0001 0101 0 011     0635                          SLLR  ALL
0125  0 0001 0101 0 011     0636                          SLLR  ALL
0126  0 0001 0101 1 011     0637                          SRLR  ALL
0127  0 1010 0100 1 111     0638                          STOH
0128  0 0001 0001 0 001     0639                          AID   ALL
0129  1 1 0001000101 0           0640  016F              BO    GOTO          ALWAYS

0136  0 0000 1011 1 000     0647                RTN       TF    BHOLD
0137  1 1 0000000111 0           0648  0133              BO    RTN3
013[illegible]  0 0000 0111 1 001     0649                          SF    BSTEP
013[illegible]  0 0000 1010 1 010     0650                          ZF    BHOLD
013[illegible]  0 1010 0101 1 111     0657                RTN3      RCLH
013[illegible]  0 0001 1111 0 110     06[illegible]                          LOADA ALL
013[illegible]  0 [illegible] 1 110     06[illegible]                          SRLD  ALL
0139  0 0001 0111 1 110     0660                          SRLD  ALL
013E  0 0001 0111 1 110     0661                          SRLD  ALL
013F  0 0001 0011 1 001     0662                          CDK   ALL
0140  0 0001 1011 1 000     0663                          TF    BCONST
0141  1 0 0000000011 0           0664  0144              BZ    RTN1
0142  0 0000 1111 1 010     0665                          ZF    BRUN
0143  1 1 0000001001 0           0666  014[illegible]              BO    RTN2          ALWAYS

0166  0 1010 1111 0 111     0705                CONROM    NUMBER 15
0167  1 1 0100011101 1           0706  004A              BO    SETED         ALWAYS BRANCH

02F[illegible]  0 0000 1011 1 000     1153                          TF    BCONST        CONSTANT ROM SUBROUTINE FLAG -BYPASS DO NOT HLT IN
                                   1154                *                            MIDDLE OF HARDWIRED FUNCTION
02FD  1 0 0000111011 0           1155  0339              BZ    STEP

0411  0 0000 1011 1 010     1450                ZDIG3     ZF    BCONST        BCONST ZEROED IN 330 K IF IN TRC MODE
0412  1 1 0010100000 1           1451  0372              BO    DIG3          ALWAYS

0609  0 0001 0110 0 000     2033                FET1      SLLA  ALL
060A  0 1010 0001 1 111     2034                          RCLF
060[illegible]  0 [illegible] 1101 0 011     2035                          LOADA [illegible]          [illegible]
060[illegible]  0 1010 [illegible] 1 111     20[illegible]                          [illegible]                [illegible]
060[illegible]  0 [illegible] 1 001     2037                          [illegible]   ALL           FETCH [illegible] FROM MEMORY
060F  0 [illegible] 1 000     20[illegible]                          [illegible]   ALL
060F  0 [illegible] 1 000     20[illegible]                FET2      CLA   [illegible]
0610  0 [illegible] 0 001     20[illegible]                          [illegible]   EXP
0611  0 [illegible] 1111 [illegible]     20[illegible]                          [illegible]   ALL
0612  0 [illegible]     2042                          SLLA  ALL
061[illegible]  0 [illegible] 1111 [illegible]     20[illegible]                          TF    [illegible]
0614  1 1 [illegible]     2044  [illegible]              BO    [illegible]
0615  0 0011 0000 1 001     2045                          CSK   LEFT1
0616  1 0 0000000011 0           2046  0610              BZ    FET2A
0617  0 1010 1010 0 111     2047                          NUMBER 10
0618  0 [illegible] 1111 0 000     2048                          [illegible]   [illegible]
0619  0 0010 1011 0 001     2049                FET2A     AAD   001
061A  0 1010 0000 1 110     2050                          [illegible]
061B  0 1010 0001 1 000     2051                          [illegible]
061C  0 0001 1101 1 110     2052                          [illegible]   ALL
061D  0 1010 0111 0 101     2053                          [illegible]
061E  1 1 [illegible] 0           2054  [illegible]              BO    FET2[illegible]
061F  0 0000 1100 0 101     2055                          SK235
0620  0 0000 1101 0 101     2056                FET2B     SK[illegible]
0621  0 [illegible] 1101 [illegible]     2057                          [illegible]   ALL
0622  0 [illegible] 1101 [illegible]     2058                          [illegible]   ALL
0623  0 [illegible] 1101 0 101     2059                          [illegible]   ALL
0624  1 1 [illegible] 0           2060  [illegible]              BO    [illegible]       ALWAYS
                                   2061                *         [illegible]   [illegible]       RELOCATION BIT IN MEMORY
                                   2062                ******** FETCH STOREIN

063C  0 0000 1011 1 000     2037                FET1A     TF    BCONST
063D  1 0 0000110100 1           2038  0609              BZ    FET1

0806  0 0000 1011 1 000     2586                PRTBEG    TF    BCONST        *****MUST BE AT LOC. 806
0807  1 0 0010101100 0           2587  0833              BZ    DOWN1
```

```
0E1F  0 0000 1011 1 000  2610              TF   BCONST
081F  1 0 0000111011 0   2611  0E5A        BZ   TRTN      TEST IF RTN FROM HARDWIRED FUNCTION
0E5A  0 1010 0111 0 101  2673        TRTN  TKRD4
0E5B  0 1010 0110 0 101  2674              TKRD3
0E5C  0 1010 0100 0 101  2675              TKRLSD
0E5D  1 0 0011110100 0   2676  0951        BZ   SKIPP
0E5E  0 1010 0101 0 101  2677              TKRD2
0E5F  1 1 0011110010 0   2678  0951        BO   SKIPP
0E60  0 0000 1011 1 010  2679              ZF   BCONST
0E61  0 0000 0101 0 001  2680              SF   AEND
0E62  0 0001 0000 0 110  2681              AAKD ALL
0E63  0 1010 0000 1 101  2682        PRTEND XKRSP
0E64  0 1010 1001 1 000  2683              STEPPRNT   SPACES OVER FUNCTION FIELD
0E65  0 1010 1001 1 000  2684              STEPPRNT
0E66  0 1010 1001 1 000  2685        PO    STEPPRNT
0E67  0 1010 1001 1 000  2686        PRO   STEPPRNT
0E68  1 1 0110110100 0   2687  0A1C  PROI  BO   PRINT17   ALWAYS
0E84  1 1 0000001010 1   2765  08AA        BO   DOWN      ALWAYS
                         2766        ***PRINT CODE FOR *CLR*
0E85  0 0000 1011 1 000  2767        CLRTST TF  BCONST
0E86  1 0 0000001010 0   2768  08C0        BZ   CLI

0EC0  0 0001 0000 0 000  2778        CLI   AAKA ALL       SPECIAL DUMMY--NO TRC OF HARDWIRED FUNCTIONS
0EC1  1 1 0011001000 1   2779  07F9        BO   SK7F9     ALWAYS
                         2780        ***CODE TO PRINT NUMBERS FOR MEMREF ROUTINES***
0EC2  0 0000 1011 1 000  2781        MEMR1 TF   BCONST
0EC3  1 0 0000011001 0   2782  090C        BZ   MEMR3

0E0C  0 0000 1101 0 010  2807        MEMR3 ZF   APRINT
0E0D  1 1 0011100000 1   2808  07E0        BO   SK7E0     ALWAYS
```

What is claimed is:

1. In an electronic microprocessor system, having input means for receiving data and for receiving input commands, output means for outputting data, a memory means for storing data received and data to be outputted, an arithmetic unit for performing arithmetic operations on data stored in said memory, and a first read-only-memory for storing groups of instruction words for controlling arithmetic operations performed by said arithmetic unit, the combination which comprises:

(a) a second read-only-memory for storing a plurality of sets of program codes, each program code being effective for addressing a preselected group of instruction words stored in said first read-only memory;

(b) addressing means, responsive to selected input commands, for addressing said second read-only-memory to read out preselected sets of program codes in response thereto, said addressing means including means, responsive to said selected input commands, for addressing said first read-only-memory to read-out selected instruction words for addressing said second read-only-memory, means responsive to a first selected instruction word for addressing a predetermined address in said second read-only-memory and means responsive to a second selected instruction word for incrementing the address addressed in said second read-only-memory; and (c) means for addressing said first read-only-memory in response to the program codes read out of said second read-only-memory.

2. An electronic microprocessor system according to claim 1 wherein said first selected instruction word is outputted from said first read-only-memory in response to input commands calling a program stored in said second read-only-memory and wherein said second selected instruction word is outputted by said first read-only-memory at the end of at least certain ones of said groups of instruction words stored in said first read-only-memory.

3. An electronic microprocessor system according to claim 2, wherein said means for addressing said first read-only-memory includes a latch means responsive to said first read-only-memory for enabling said means for addressing said first read-only-memory whenever said latch means is set and for disabling said means for addressing said first read-only-memory whenever said latch means is reset.

4. In a battery-operated, hand-held, electronic calculating system having a keyboard for inputting data and input commands, a data memory for storing inputted data and data to be outputted, a display for displaying the data to be outputted, an arithmetic unit for performing arithmetic operations on the data stored in said memory and a first semiconductor read-only-memory for storing groups of instruction words, the instruction words controlling the arithmetic operations performed by said arithmetic unit, the combination which comprises;

(a) a second semiconductor read-only-memory for storing a plurality of sets of program codes, each program code being effective for addressing a preselected group of instruction words stored in said first read-only-memory;

(b) means, responsive to selected input commands, for addressing said second read-only-memory to read out preselected sets of said program codes in response thereto; said means including a program address register, means for incrementing the address in said program address register in response to a control signal and means for generating said control signal towards the end of the groups of instruction words outputted from said first read-only-memory in response to the program codes read out of said second read-only-memory; and (c) means for addressing said first read-only-memory in response to the program codes read out of said second read-only-memory.

5. The calculator according to claim 4, wherein said means for addressing said first read-only-memory includes a program counter and latch means having set and reset states, said latch means being set in response to said selected input commands and being reset in response to the reading out of a last program code in a group of program codes read out of said second read-only-memory, said latch means communicating said program code to said program counter when said latch means is set.

6. An electronic, handheld calculator comprising:

(a) a keyboard having a first plurality of function keys for inputting selected function commands to said calculator and a second plurality of function keys for inputting other selected function commands to said calculator;

(b) first read-only-memory means for storing groups of instruction words;

(c) an instruction register for addressing said first read-only-memory means;

(d) second read-only-memory means for storing groups of program codes;

(e) a program counter for addressing said second read-only-memory means;

(f) a keyboard register;

(g) keyboard logic means for inserting a unique address in said keyboard register in response to each depression of one of the keys at said keyboard;

(h) means for outputting the contents of said keyboard register to said instruction register;

(i) latch means;

(j) an arithmetic unit;

(k) instruction word decoder means responsive to the instruction words outputted from said first read-only-memory means for controlling said arithmetic unit to perform said selected function commands inputted at said keyboard;

(l) means for setting the state of said latch means in response to the depression of one of said second plurality of keys;

(m) means for inserting an address into said program counter in response to the depression of one of said second plurality of keys;

(n) means for incrementing the address in said program counter in response to a control signal;

(o) means responsive to the state of said latch means for inserting into said instruction register the program code outputted from sadi second read-only-memory means;

(p) control means for generating said control signal towards the end of the groups of instructions words outputted from said first read-only-memory means in response to the program code inserted into said instruction register; and (q) means for resetting the state of latch means in response to the reading out of a last program code in a group of program codes.

* * * * *